United States Patent
Gholmieh et al.

(10) Patent No.: US 9,386,062 B2
(45) Date of Patent: Jul. 5, 2016

(54) ELASTIC RESPONSE TIME TO HYPERTEXT TRANSFER PROTOCOL (HTTP) REQUESTS

(71) Applicant: QUALCOMM Incorporated, San Diego, CA (US)

(72) Inventors: Ralph A. Gholmieh, San Diego, CA (US); Nagaraju Naik, San Diego, CA (US); Nermeen A. Bassiouny, San Diego, CA (US); Thadi M. Nagaraj, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 271 days.

(21) Appl. No.: 13/802,718

(22) Filed: Mar. 14, 2013

(65) Prior Publication Data
US 2014/0189066 A1    Jul. 3, 2014

Related U.S. Application Data

(60) Provisional application No. 61/747,188, filed on Dec. 28, 2012.

(51) Int. Cl.
*G06F 15/16* (2006.01)
*H04L 29/06* (2006.01)
*H04L 29/08* (2006.01)
*H04N 21/24* (2011.01)
*H04N 21/442* (2011.01)
*H04N 21/63* (2011.01)
*H04N 21/6377* (2011.01)
(Continued)

(52) U.S. Cl.
CPC .......... *H04L 65/601* (2013.01); *H04L 65/4084* (2013.01); *H04L 65/608* (2013.01); *H04L 65/80* (2013.01); *H04L 67/02* (2013.01); *H04L 67/325* (2013.01); *H04L 67/327* (2013.01); *H04N 21/2402* (2013.01); *H04N 21/2407* (2013.01); *H04N 21/2408* (2013.01); *H04N 21/262* (2013.01); *H04N 21/44204* (2013.01); *H04N 21/44209* (2013.01); *H04N 21/632* (2013.01); *H04N 21/6377* (2013.01); *H04N 21/845* (2013.01); *H04N 21/8456* (2013.01)

(58) Field of Classification Search
CPC ..... H04L 65/60; H04L 65/604; H04L 65/608; H04L 67/02; H04N 21/23424; H04N 21/812; H04N 21/2381; H04N 21/2393; H04N 21/438; H04N 21/44209; H04N 21/4622; H04N 21/47202; H04N 21/64315; H04N 21/64322; H04N 21/84; H04N 21/8456; H04N 21/8586
See application file for complete search history.

(56) References Cited

U.S. PATENT DOCUMENTS 9,178,535 B2    11/2015    Luby et al.
2002/0034215 A1    3/2002    Inoue et al.
(Continued)

OTHER PUBLICATIONS

Adams, et al., "Optimizing Fairness of HTTP Adaptive Streaming in Cable Networks", Solution Area Media, Ericsson, May 2012, 10 pgs.
(Continued)

*Primary Examiner* — Ryan Jakovac (57) ABSTRACT

The systems, methods, and devices of the various embodiments enable elastic response times to file requests by a server. In this manner, the server may account for unpredictable delay in object/segment availability and reduce the frequency that error messages (e.g., 404 error messages) are returned in response to file requests when file unavailability is temporary and due to network delays.

4 Claims, 7 Drawing Sheets

(51) Int. Cl.
*H04N 21/845* (2011.01)
*H04N 21/262* (2011.01)

(56) References Cited

U.S. PATENT DOCUMENTS

| | | | |
|---|---|---|---|
| 2005/0227657 | A1 | 10/2005 | Frankkila et al. |
| 2006/0095573 | A1* | 5/2006 | Carle et al. ............ 709/227 |
| 2008/0005767 | A1 | 1/2008 | Seo |
| 2010/0299433 | A1* | 11/2010 | De Boer et al. .......... 709/224 |
| 2011/0001833 | A1* | 1/2011 | Grinkemeyer ......... H04H 20/12 348/192 |
| 2011/0261401 | A1 | 10/2011 | Yabe et al. |
| 2012/0102184 | A1 | 4/2012 | Candelore |
| 2012/0254456 | A1 | 10/2012 | Visharam et al. |
| 2012/0281536 | A1 | 11/2012 | Gell et al. |
| 2012/0320784 | A1 | 12/2012 | Edwards et al. |
| 2012/0327779 | A1 | 12/2012 | Gell et al. |
| 2013/0042100 | A1 | 2/2013 | Bouazizi et al. |
| 2013/0142055 | A1 | 6/2013 | Bao et al. |
| 2013/0282917 | A1 | 10/2013 | Reznik et al. |
| 2013/0286868 | A1 | 10/2013 | Oyman et al. |
| 2014/0019587 | A1 | 1/2014 | Giladi |
| 2014/0019593 | A1 | 1/2014 | Reznik et al. |
| 2014/0019635 | A1 | 1/2014 | Reznik et al. |
| 2014/0025830 | A1* | 1/2014 | Grinshpun ......... H04N 21/2662 709/227 |
| 2014/0040498 | A1 | 2/2014 | OYMAN; Ozgur et al. |
| 2014/0068648 | A1 | 3/2014 | Green et al. |
| 2014/0150014 | A1 | 5/2014 | Aitken et al. |
| 2014/0156800 | A1* | 6/2014 | Falvo ..................... 709/219 |
| 2014/0189052 | A1 | 7/2014 | Gholmieh et al. |

OTHER PUBLICATIONS

Kim, et al., "A Study on Dynamic Adaptive Streaming System over HPPT for Various Streaming Services", International Journal of Future Generation Communication and Networking. vol. 5, No. 3, Sep. 2012, pp. 83-92.

Mansy k, et al., "SABRE: A Client Based Technique for Mitigating the Buffer Bloat Effect of Adaptive Video Flows," Research area: Multimedia networking, 2012, Georgia Institute of Technology, pp. 1-13.

Manuscript, Future Media Internet: Video & Audiotransport—A New Paradigm, WS 2011-12, Saarland University, Telecommunications Lab, Prof. Dr. Ing. Thorsten Herfet, pp. 1-141.

Miller K., et al., "Adaptation Algorithm for Adaptive Streaming over HTTP," 19th International Packet Video Workshop (PV), 2012, pp. 173-178.

Romero, L., "A Dynamic Adaptive HTTP Streaming Video Service for Google Android", Royal Institute of Technology—School of Information and Communication Technology (ICT). Stockholm, Sweden, Oct. 2011, 148 pgs.

Singh S., et al., "Interference Shaping for Improved Quality of Experience for Real-Time Video Streaming," IEEE Journal on Selected Areas in Communications, Aug. 2012, vol. 30 (7), pp. 1259-1269.

Siraj, M., "HTTP Based Adaptive Streaming over HSPA", Royal Institute of Technology—School of Information and Communication Technology (ICT). Stockholm, Sweden, Apr. 2011, 73 pgs.

Sodagar I., "The MPEG-DASH Standard for Multimedia Streaming Over the Internet", IEEE Multimedia, vol. 18, No. 4, Apr. 1, 2011, pp. 62-67, XP011378371, ISSN: 1070-986X, DOI: 10.1109/MMUL. 2011.71.

Yu Y.T., et al., "Adaptive Transmission Control Protocol-Trunking Flow Control Mechanism for Supporting Proxy-Assisted Video on Demand System," International Journal of Communication Systems, 2011, pp. 1-22.

"3rd Generation Partnership Project; Technical Specification Group Services and System Aspects; Transparent end-to-end Packet-switched Streaming Service (PSS); Progressive Download and Dynamic Adaptive Streaming over Http (3GP DASH). (Release 11)", 3GPP Standard; 3GPP TS 26.247, 3rd Generation Partnership Project (3GPP), Mobile Competence Centre ; 650, Route Des Lucioles ; F-06921 Sophiaantipolis Cedex; France, vol. SA WG4, No. V11.1.0, Dec. 5, 2012, pp. 1-113, XP050691164.

Giladi a, "Low-latency live broadcast support in DASH", 102. MPEG Meeting; Oct. 15, 2012-Oct. 19, 2012; Shanghai; (Motion Picture Expert Group of ISO/IEC JTC/SC29/WG11 No. m26652, Oct. 12, 2012, XP030054985.

International Search Report and Written Opinion—PCT/US2013/075441—ISA/EPO—Mar. 28, 2014.

"Open IPTV Forum a Release 2 Specification HTTP Adaptive Streaming Draft V0.04.01", 3GPP Draft; OIPF-DR-HAS-V0_ 04 01-2010-04-23, 3rd Generation Partnership Project (3GPP), Mobile Competence Centre ; 650, Route Des Lucioles ; F-06921 Sophia-Antipolis Cedex ; France, vol. SA WG4, No. Vancouver, Canada; Apr. 26, 2010, Apr. 29, 2010, XP050437971, [ retrieved on Apr. 29, 2010] Introduction, chapter 3.1.

Stockhammer T, "DASH: Device Playout Synchronization for Live Service", 97.MPEG Meeting; Jul. 18, 2011-Jul. 22, 2011; Torino; (Motion Picture Expert Group or ISO/IEC JTC1/SC29/WG11) No. m20347, Jun. 17, 2011, XP030048911.

* cited by examiner

ELASTIC RESPONSE TIME TO HYPERTEXT TRANSFER PROTOCOL (HTTP) REQUESTS

RELATED APPLICATIONS

This application claims the benefit of priority to U.S. Provisional Patent Application No. 61/747,188 entitled "Device Timing Adjustments and Method for Supporting DASH Over Broadcast" filed Dec. 28, 2012, the entire contents of which are hereby incorporated by reference.

BACKGROUND

Hypertext Transfer Protocol (HTTP) streaming is currently the most popular method of delivering content over the Internet. For live events, content is made available progressively through constant duration segments. The segment availability follows a timeline that indicates when each successive segment becomes available in the HTTP server.

Dynamic Adaptive Streaming Over Hypertext Transfer Protocol (DASH) is a standard that implements HTTP streaming DASH announces the segment availability in a Media Presentation Description (MPD). The MPD is a segment availability timeline that announces the segments, the times segments are available, and the size of the segments.

In current systems, the MPD is provided to a receiver device via Over-the-Air (OTA) delivery. In the provided MPD, the segment availability times may correspond to the encoder output times of the network side encoder generating the segments. Because the segment availability times may correspond to the encoder output times, the availability times may not account for differences in actual segment availability to a DASH client running on a receiver device, such as delivery path delays, receiver device processing delays, or receiver device clock drift. Thus, the announced availability times in current MPDs may not correspond to the actual times when segments will be available to a DASH client.

A similar problem occurs when DASH content is delivered through Content Delivery Networks (CDNs). The DASH content is created at a source encoder, however the availability time of the segment at remote CDN servers may be different at different CDN serving points.

SUMMARY

The systems, methods, and devices of the various embodiments enable elastic response times to file requests by a server. In this manner, the server may account for unpredictable delay in object/segment availability and reduce the frequency that error messages (e.g., 404 error messages) are returned in response to file requests when file unavailability is temporary and due to network delays.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

As used herein, the terms "mobile device" and "receiver device" are used interchangeably herein to refer to any one or all of cellular telephones, smart phones, personal or mobile multi-media players, personal data assistants (PDA's), laptop computers, tablet computers, smart books, palm-top computers, wireless electronic mail receivers, multimedia Internet enabled cellular telephones, wireless gaming controllers, and similar personal electronic devices which include a programmable processor and memory and circuitry for receiving files and providing files to requesting applications/clients, such as requesting DASH clients.

As used herein, the terms "segment," "object," and "file" are used interchangeably herein to refer to any one or all data structures or data units which may be requested from a server.

Dynamic Adaptive Streaming Over Hypertext Transfer Protocol (DASH) is a standard that implements HTTP streaming DASH announces the segment availability in a Media Presentation Description (MPD). The MPD is a segment availability timeline that announces the segments, the times segments are available, and the size of the segments. In current systems, the MPD is provided to a receiver device via Over-the-Air (OTA) delivery. The Third Generation Partnership Project (3GPP) has standardized DASH over Download Delivery as a method to be used for providing HTTP streaming using broadcast over Long Term Evolution (LTE)(i.e., evolved Multimedia Broadcast Multicast Services (eMBMS)).

Various examples of different applications/clients, middleware, segment availability timelines, radio technologies, and transport protocols are discussed herein, specifically DASH clients, Multicast Service Device Clients, MPDs, eMBMS, and HTTP. The discussions of DASH clients, Multicast Service Device Clients, MPDs, eMBMS, and HTTP are provided merely as examples to better illustrated the aspects of the various embodiments, and are not intended to limit the various embodiments in any way. Other applications/clients, middleware, segment availability timelines, radio technologies, and transport protocols may be used with the various embodiments, and the other applications/clients, middleware, segment availability timelines, radio technologies, and transport protocols may be substituted in the various examples without departing from the spirit or scope of the invention.

The various embodiments enable a receiver device to account for delays in the availability of data segments ("segment availability") in a data stream for use on the receiver device. In an embodiment, a server (e.g., a local HTTP server on the receiver device providing segments to requesting applications/clients, such as requesting DASH clients) may operate with elastic response times for serving segments in response to segment requests. In this manner, the server may account for unpredictable delay in segment availability.

In an embodiment, network jitter estimates may be provided in a media description fragment that describes the segment availability timeline (e.g., MPD) sent to the receiver device. In another embodiment, the network jitter may be pre-provisioned on the receiver device (e.g., stored in a non-volatile memory of the receiver device at the time of manufacture). In other embodiments, the network jitter estimate may be delivered to the receiver device in any message, such as in a service announcement. As used herein, "jitter" refers to the difference between earliest and latest possible arrival times of a segment as a difference from the availability timeline of the segment.

As used herein, "network jitter" refers to the maximum difference between the earliest and latest relative arrival time of the segment at a receiver device. The relative arrival time refers to the difference between the absolute arrival time and an expected arrival time according to the delivery timeline. In an embodiment, the delivery timeline may provide the expected arrival time of every segment in the list of segments carrying the media of a service, and the delivery timeline may be defined such that the next segment availability may be that of the preceding segment availability plus the preceding segment's duration based on the provided absolute availability time of the first segment. In another embodiment, the availability time may be provided as absolute values for successive segments. In yet another embodiment, the availability time may be provided as a periodic availability within periods. In a further embodiment, the availability time may be provided as a combination of mechanisms, such as a combination of absolute values and period availabilities. Network jitter may be related to variability in segment size, scheduling period granularity (e.g., multicast channel (MCH) scheduling period granularity of 320 ms variability around 1 second periodicity of arrival of segments), network equipment delays (e.g., bandwidth, transmission delays, processing delays, buffer delays, etc.). Network jitter may be context dependent. For example, variability in video segment size may cause the network jitter estimates to vary between 70% and 130% of the average size of the video segment.

As used herein, "receiver device jitter" refers to the maximum difference between the arrival time of the segment and availability of the segment to the requesting application/client running on the receiver device. Receiver device jitter may be related to variability in segment size, scheduling period granularity (e.g., MCH scheduling period granularity of 320 ms variability around 1 second periodicity of arrival of segments), processing delays on the receiver device (e.g., Forward Error Correction (FEC) processing, decoding time, etc.), and receiver device clock drift.

The delivery of network jitter estimates in the segment availability timeline (e.g., MPD) may enable better estimates of buffering requirements at the receiver device server (e.g., local HTTP server on the receiver device), improvement to timeline adjustments when the receiver device clock is not synchronized to a server clock, and/or an elastic server response time algorithm (e.g., elastic HTTP server response time algorithm) that operates without the need for timeline calculation.

In current systems, the availability time in the MPD provided to the device may be set such that all requests for segments will be made after segments become available on the local HTTP server on the device. However, this built in adjustment in the provided MPD results in a delay in serving segments to the users consuming the service until segments are guaranteed to be available on the local HTTP server. As examples, in current systems if jitter is large, delay is small except for statistical outliers, or there is clock drift at the device, the availability time in the provided MPD will be pre-adjusted for worst case clock drift (e.g., one second, two second, multiple seconds, etc.). As a result the requests for segments will be made much later than when the segments are actually available at the receiver device because each segment's availability time is adjusted for worst case clock drift whether or not a worst case delay is occurring. The delayed request directly increases latency on the delivery path as well as channel switch and initial acquisition delays.

The systems, methods, and devices of the various embodiments enable elastic response times to file requests by a server. In this manner, the server may account for unpredictable delays in segment availability and reduce the frequency of error messages (e.g., 404 error messages) that are returned in response to file requests when file unavailability is temporary and due to network delays. In the various embodiments, elastic response times to file requests by a server may enable latency and delays to be reduced and segments to be made available when actually received. In an embodiment, the availability times in the MPD may be set to account for normal delays (e.g., $90^{th}$ percentile delays) without accounting for clock drift. In an embodiment, the DASH client may be enabled to make requests for segments earlier than the time listed in the received MPD and may be served the segments either immediately or as soon as the segment becomes available based on elastic response times to file requests by a server.

Figure 1:
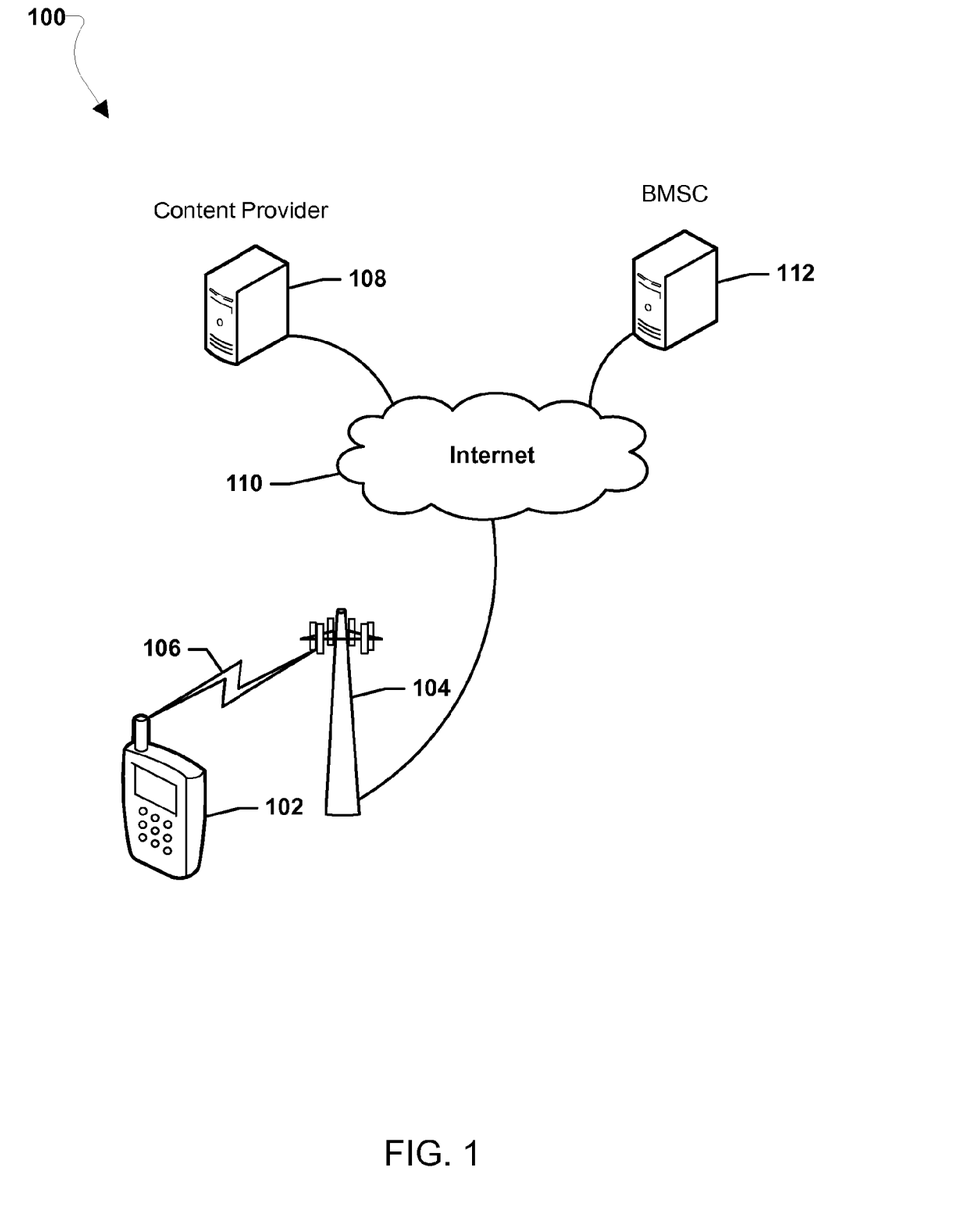
FIG. 1 is a communication system block diagram of a network suitable for use with the various embodiments.

FIG. 1 illustrates a cellular network system 100 suitable for use with the various embodiments. The cellular network system 100 may include multiple devices, such as a receiver device 102, one or more cellular towers or base stations 104, and servers 108 and 112 connected to the Internet 110. The receiver device 102 may exchange data via one or more cellular connections 106, including CDMA, TDMA, GSM, PCS, 3G, 4G, LTE, or any other type connection, with the cellular tower or base station 104. The cellular tower or base station 104 may be in communication with a router which may connect to the Internet 110. In this manner, via the connections to the cellular tower or base station 104, and/or Internet 110, data may be exchanged between the receiver device 102 and the server(s) 108 and 112. In an embodiment, server 108 may be a content provider server or encoder providing MPDs and segments for output via a DASH client. In an embodiment, server 112 may be a Broadcast Multimedia Service Center (BMSC) server which may receive MPDs and segments output from the encoder and control the OTA transmission of the MPDs and segments to the receiver device 102. Of course, while features of receiver devices described herein may be described with reference to OTA transmissions, these features may be used in connection with wired transmissions, wireless transmissions, or a combination of wired and wireless transmissions. Thus, OTA transmission is not required.

Figure 2:
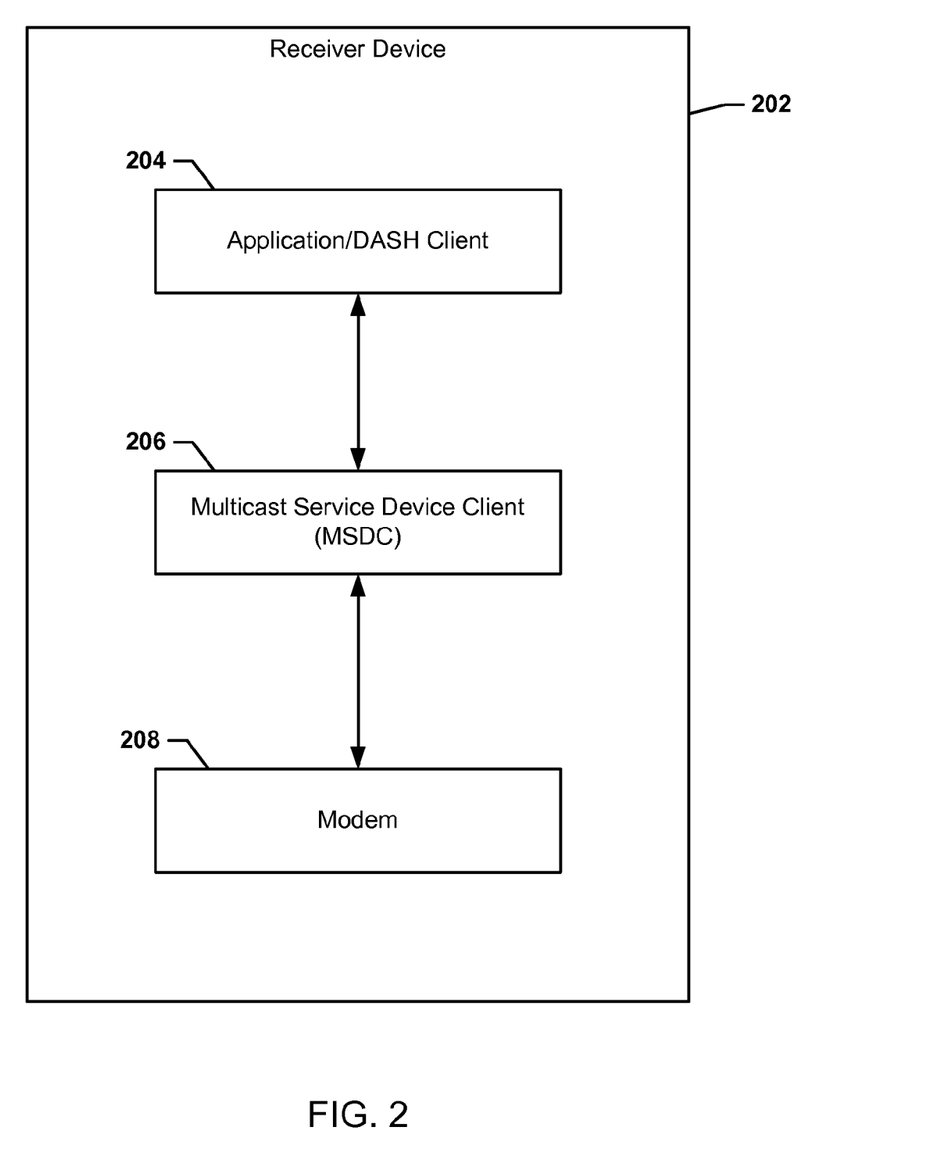
FIG. 2 is a block diagram illustrating the architecture of a receiver device according to an embodiment.

FIG. 2 illustrates a simplified receiver device 202 architecture according to an embodiment. The receiver device 202 may include a modem layer 208 which manages all radio aspects of the receiver device 202, such as acquisition, handoff, link maintenance, etc. The modem layer 208 may decode a received eMBMS bearer signal and deliver Internet Protocol (IP) packets to the Multicast Service Device Client (MSDC) 206. The Multicast Service Device Client 206 may be a service layer of the receiver device 202 which recovers segments from the delivered IP packets and makes segments available to applications/clients, such as Application/DASH client 204. The Multicast Service Device Client 206 may also recover an MPD from the delivered IP packets. The Multicast Service Device Client 206 may store received segments in a memory of the receiver device. In an embodiment, the Multicast Service Device Client 206 may operate as a local Hypertext Transfer Protocol (HTTP) server for the receiver device 202 providing segments to applications/clients, such as Application/DASH client 204. In another embodiment, the Multicast Service Device Client 206 may operate in conjunction with a separate local Hypertext Transfer Protocol (HTTP) server on the receiver device 202 to provide segments to applications/clients, such as Application/DASH client 204. The Application/DASH client 204 may be a DASH enabled application and/or an application which launches a DASH client to present media (directly and/or via another application such as a media player). The Application/DASH client 204 may obtain the MPD location (e.g., Uniform Resource Locator (URL)) from the Multicast Service Device Client 206, request and receive the MPD from the Multicast Service Device Client 206, and may request segments from the Multicast Service Device Client 206 per the availability timeline in the MPD. The Application/DASH client 204 may receive the requested segments from the Multicast Service Device Client 206 and may render the segment contents (directly and/or via another application such as a media player).

Figure 3:
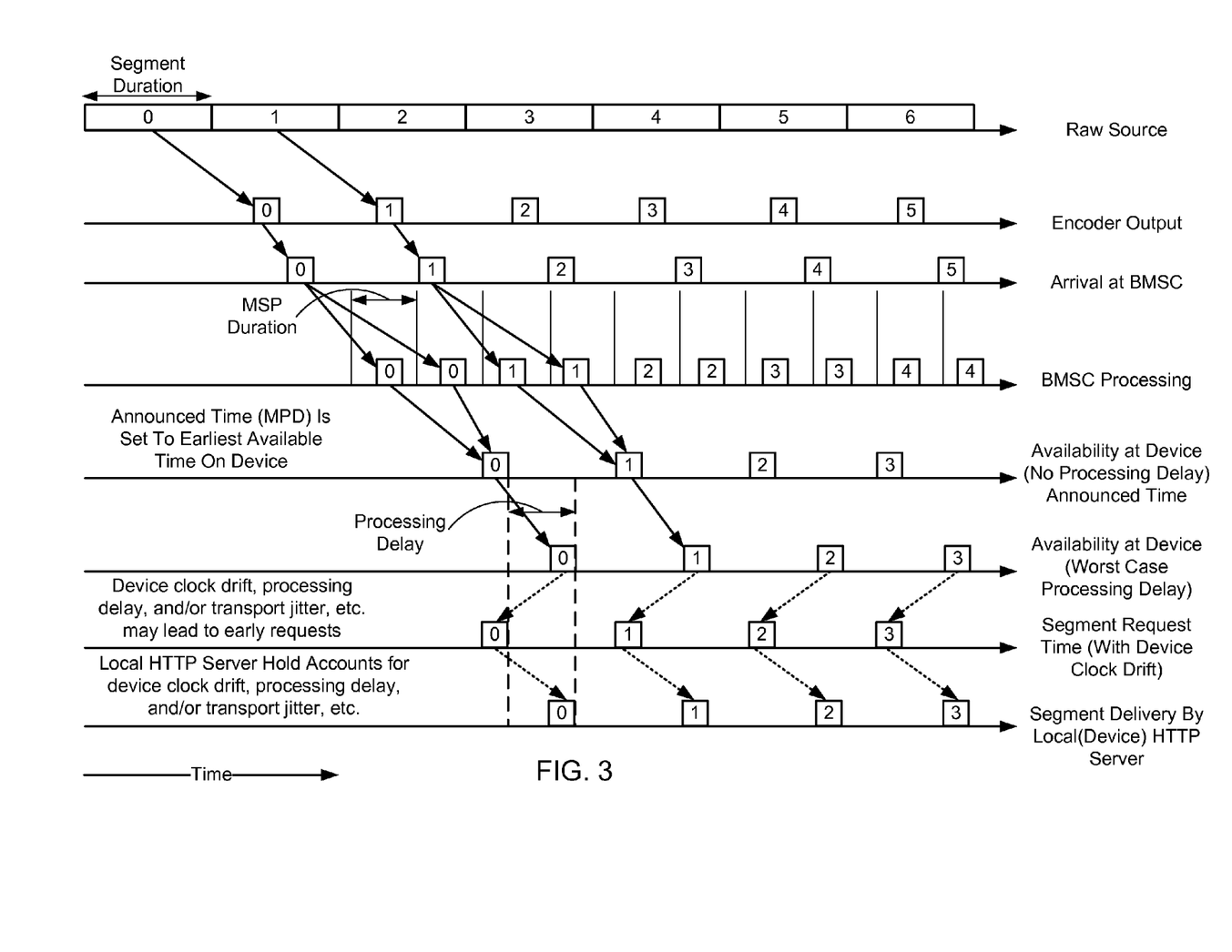
FIG. 3 illustrates segment availability times according to another embodiment.

FIG. 3 illustrates various delays on the streaming path and the effects of those delays on segment availability over time that may be experienced by receiver devices, such as eMBMS receiver devices. Segments may be produced at an encoder and broadcast over a broadcast network, such as an LTE broadcast network. The broadcast segments may be received on the receiver device and stored in a local HTTP server and made available for consumption by a DASH client running on the receiver device. The DASH client may request segments according to the segments availability time listed in the MPD of the service associated with the segments. Segments may be unavailable when received at the receiver device beyond the availability time listed in the MPD. In the embodiment illustrated in FIG. 3, the local host HTTP server on the receiver device may be enabled to hold requests for unavailable segments. In this manner, should the segment arrive late, this late arrival may be accommodated because the request for that segment may be held until the segment is available.

In an embodiment, a live recorded raw media source may be broken into segments (e.g., 0, 1, 2, 3, 4, 5, 6 illustrated in FIG. 3) by an encoder. The encoder may synchronize the boundaries of the segments according to a network time protocol (NTP) time and the segments 0, 1, 2, 3, 4, 5, 6 may be output from the encoder following an encoding delay. In an embodiment, the encoder may generate an availability timeline (e.g., an encoder generated MPD) listing availability times of the segments 0, 1, 2, 3, 4, 5, 6 as the encoder output time. The encoder may send the segments 0, 1, 2, 3, 4, 5, 6 and the MPD to a BMSC, and the transport of the segments 0, 1, 2, 3, 4, 5, 6 to the BMSC may further delay the segments 0, 1, 2, 3, 4, 5, 6. The BMSC may process the segments to break the segments into media segment packets (MSPs), synchronize the MSPs, and schedule the MSPs for OTA transmission. Each MSP may be assigned a set MSP duration, such as 1 second. The MSPs may be broadcast OTA to the receiver device and upon receipt of the MSPs for the segment at the receiver device the segment may be received at the device. In an embodiment, the time between the raw media source segment recording and the receipt of the MSPs corresponding to the segment at the receiver device may be the network jitter. In an embodiment, the BMSC may also send the MPD to the receiver device. While the MSPs corresponding to the segment may be received at the receiver device, additional processing may be required before the segments are available at the receiver device. Additional processing may include unpacking and reconstituting the segments 0, 1, 2, 3, 4, 5, 6 from their respective MSPs, applying FEC, decoding the segments, etc. A worst case processing delay at the receiver device may further delay the availability of the segments 0, 1, 2, 3, 4, 5, 6. In addition to a worst case processing delay, receiver clock drift may further impact the availability time of segments 0, 1, 2, 3, 4, 5, 6 at the receiver device.

In an embodiment, when segments (e.g., 0, 1, 2, 3, 4, 5, 6) arrive at the receiver, processing may delay the availability of segments, and clock drift may result in an early request for segments by the Applications/DASH client. In the embodiment illustrated in FIG. 3, the announced time in the MPD may be set to the earliest available time on the device. When device clock drift, processing delay, and/or transport jitter result in early requests for segments (i.e., requests for segments before they are available), the local HTTP server may hold such requests in memory (i.e., not process the requests immediately) in order to account for device clock drift, processing delay, and/or transport jitter and respond with the requested segment when the segment becomes available. In this manner, clock drift and variability in segment processing may be accounted for.

In an embodiment, making the availability timeline aggressively early may result in Applications/DASH clients not requesting all necessary segments at start time because segments listed in the segment availability timeline may have a corresponding availability time that was before the start time of the Application/DASH client. In an embodiment, the Applications/DASH clients may be enabled to make segment requests for both segments listed as currently available per the availability timeline and earlier available segments (e.g., one, two, or more segments whose availability time of is before that of the segment that is currently available per the timeline in the MPD). In an embodiment, the Applications/DASH clients may request all received segments at startup time of the application. In an embodiment, the number of past segments that may be requested may be determined as the delay jitter divided by the segment duration. As an example, if the jitter is three seconds, the segment duration is one second, the service is started at 8:00:00, and segment with index 100 is available at 8:00:00 per the MPD, as a result the Application/DASH client may determine three segments should be requested (i.e., three second jitter divided by one second segment duration) and issue requests for segments 98, 99, and 100 at start-up.

In an embodiment, enabling the HTTP server to hold requests, and thereby have an elastic response time to HTTP requests, may reduce startup, end-to-end, and switching delays, as well as enabling a media player to start as soon as the first segment is received. A drawback to starting the media player as soon as the first segment is received may be that a re-buffering event may occur if the availability of the next segment is delayed. Additionally, starting the media player as soon as the first segment is received in situations where slow drifting clocks are present may result in re-buffering happening at periodic long intervals.

Figure 4:
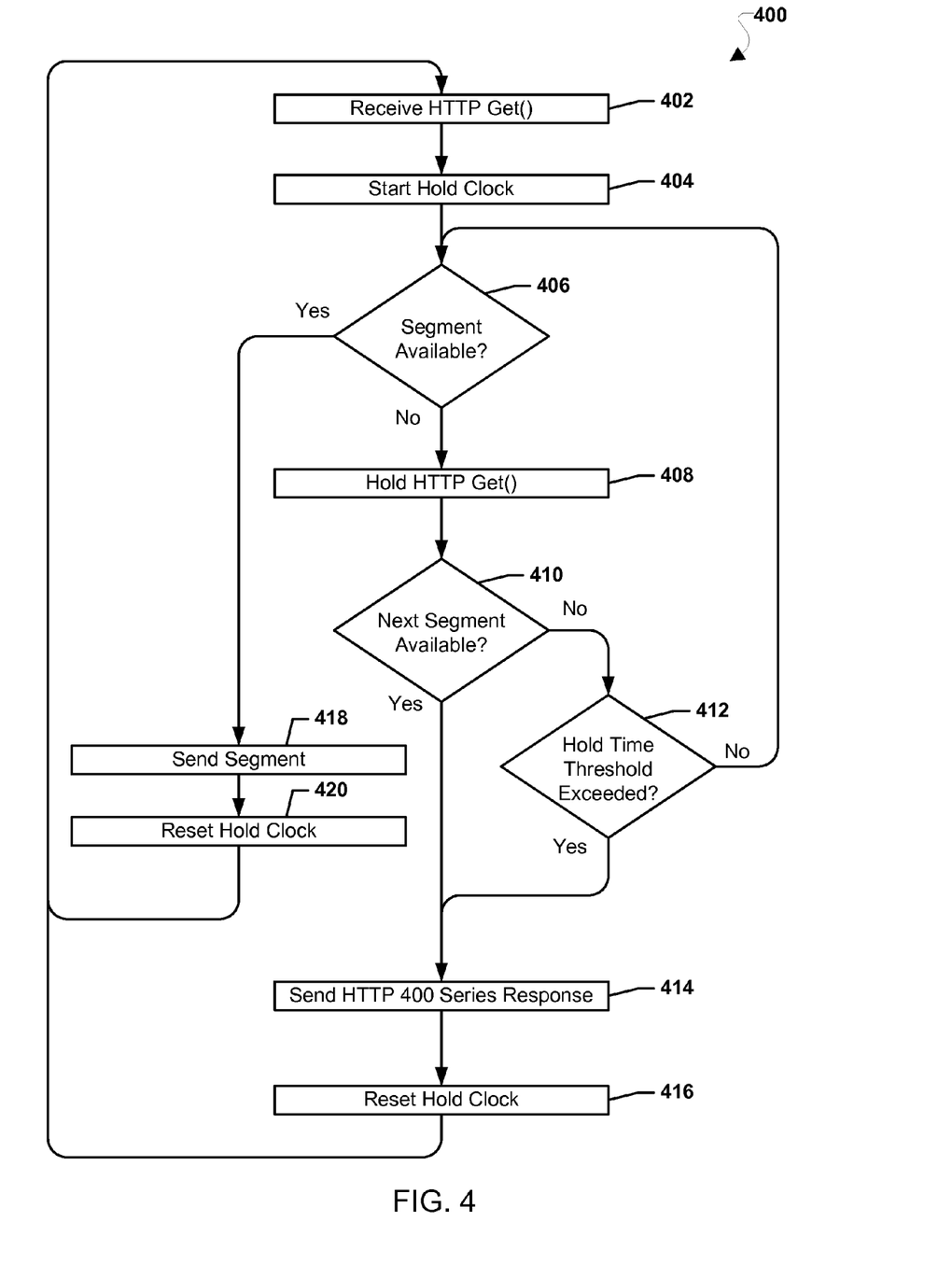
FIG. 4 is a process flow diagram illustrating an embodiment method for delaying a response to an HTTP request.

FIG. 4 illustrates an embodiment method 400 for delaying a response to an HTTP request. While discussed in relation to a delayed response by a local host server providing segments to a DASH client, the operations of method 400 may be performed by any HTTP server to delay responding to file requests. In block 402 the HTTP server may receive an HTTP Get( ) request. In an embodiment, the HTTP Get( ) request may be a request for a segment from a DASH client. In block 404 the HTTP server may start a hold clock for the request. In block 406 the HTTP server may determine whether the requested segment is available. If the segment is available (i.e., determination block 406="Yes"), in block 418 the HTTP server may send the segment to the requestor (e.g., the DASH client) and in block 420 may reset the hold clock. In block 402 the HTTP server may return to block 402 to await the next HTTP Get( ) request.

If the segment is not available (i.e., determination block 406="No"), in block 408 the HTTP server may hold the HTTP Get( ) request. In block 410 the HTTP server may determine whether the next segment in the series is available. In an embodiment, if the next segment listed in an MPD is already available the missing segment may not be required. If the next segment is available (i.e., determination block 410="Yes"), in block 414 the HTTP server may send an error indication, such as a HTTP 400 series response (e.g., 404 or 410), to the requestor (e.g., the DASH client). In block 416 the HTTP server may reset the hold clock. In block 402 the HTTP server may return to block 402 to await the next HTTP Get( ) request.

If the next segment is not available (i.e., determination block 410="No"), in determination block 412 the HTTP server may determine whether a hold time threshold has been exceeded. In an embodiment, the hold time threshold may be a delay jitter plus segment duration plus the current time. In an embodiment, the hold time threshold may be based at least in part on an expected delivery time of the requested segment to the HTTP server. In a further embodiment, the hold time threshold may also include a safety margin accounting for a delivery delay or a processing delay. In another embodiment, the hold time threshold may be the availability time of the segment in the segment availability time line. As an example, the hold time threshold may be based at least in part on a delivery time listed in an MPD describing the requested DASH segment.

The hold time threshold may be exceeded when the time on the hold clock is greater than hold time threshold. If the hold time threshold is exceeded (i.e., determination block 412="Yes"), in block 414 the HTTP server may send an error indication, such as a HTTP 400 series response (e.g., 404 or 410), to the requestor (e.g., the DASH client). In block 416 the HTTP server may reset the hold clock. In block 402 the HTTP server may return to block 402 to await the next HTTP Get( ) request. If the hold time clock is not exceeded (i.e., determination block 412="No"), in block 406 the HTTP server may determine whether the segment has become available. In this manner, the HTTP Get( ) request may be held until the segment is available, the next segment is available, or the hold time threshold is exceeded.

Figure 5:
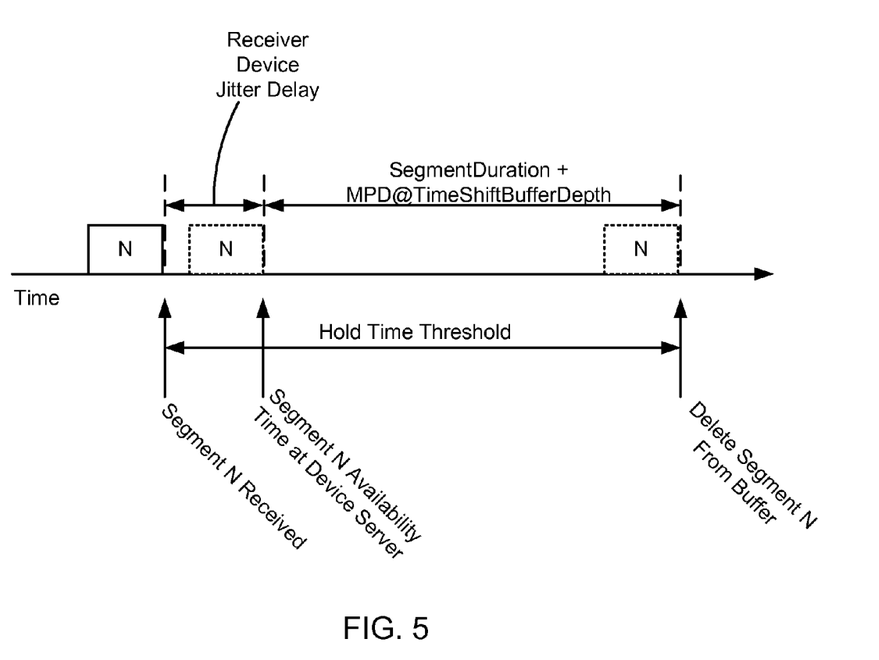
FIG. 5 illustrates the status of a segment buffer over time according to an embodiment.

FIG. 5 illustrates the status of a segment buffer over time according to an embodiment that may be used to determine the hold time threshold for an elastic server. In an embodiment, after segment N is received the receiver device jitter delay may result in the segment N not being immediately available at the local HTTP server. Once the segment N is available the segment duration plus the MPD@TimeShiftBufferDepth may define a buffer time to live for the segment, after which the segment may be deleted from the buffer. In an embodiment, to account for the receiver device jitter delay and the time to live for the segment, the hold time threshold for holding HTTP Get( ) requests for unavailable segments may be set to the receiver device jitter delay plus the segment duration plus the MPD@TimeShiftBufferDepth.

In another embodiment, the hold time threshold may be variable. As described above with reference to FIG. 3, segments may be requested by an Application/DASH client before they are available on the receiver device. In an embodiment, the HTTP server may be enabled to hold the HTTP Get( ) requests until the time the segment is actually received. In this manner, segments for which a Get( ) request is held may be served to the requesting Application/DASH client as soon as the segments become available to the HTTP server.

Figure 6:
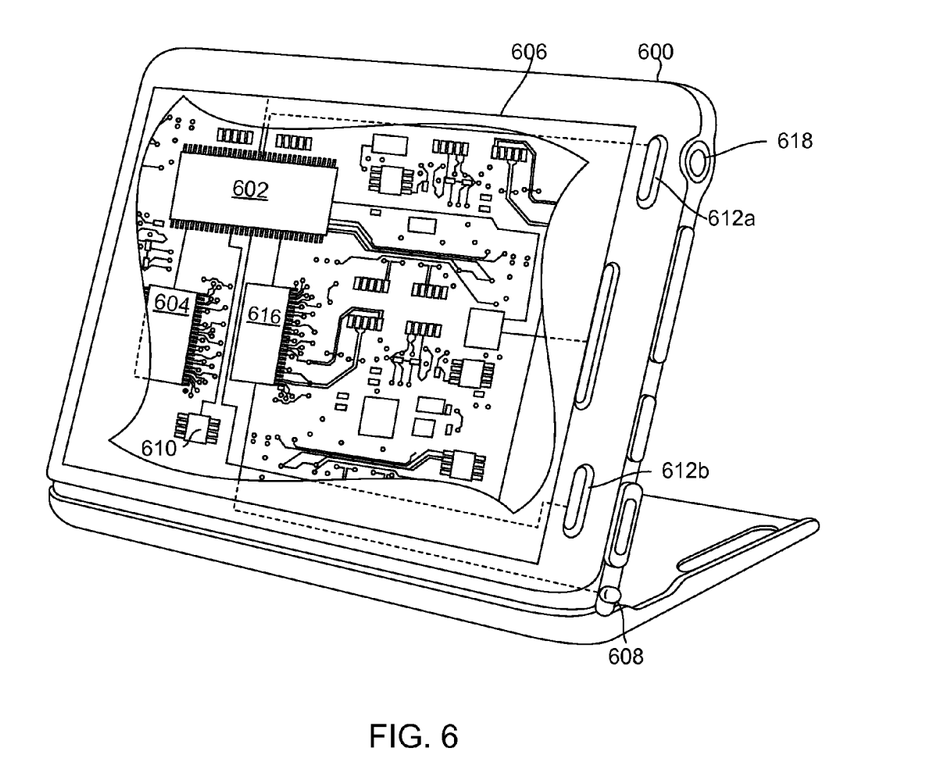
FIG. 6 is a component diagram of an example mobile device suitable for use with the various embodiments.

The various embodiments may be implemented in any of a variety of mobile devices (i.e., receiver devices), an example of which is illustrated in FIG. 6. For example, the mobile device 600 may include a processor 602 coupled to internal memories 604 and 610. Internal memories 604 and 610 may be volatile or non-volatile memories, and may also be secure and/or encrypted memories, or unsecure and/or unencrypted memories, or any combination thereof. The processor 602 may also be coupled to a touch screen display 606, such as a resistive-sensing touch screen, capacitive-sensing touch screen infrared sensing touch screen, or the like. Additionally, the display of the mobile device 600 need not have touch screen capability. Additionally, the mobile device 600 may have one or more antenna 608 for sending and receiving electromagnetic radiation that may be connected to one or more network transceivers 616, such as a wireless data link and/or cellular (e.g., CDMA, TDMA, GSM, PCS, 3G, 4G, LTE, or any other type) transceiver, coupled to the processor 602. The mobile device 600 may also include physical buttons 612*a* and 612*b* for receiving user inputs. The mobile device 600 may also include a power button 618 for turning the mobile device 600 on and off.

Figure 7:
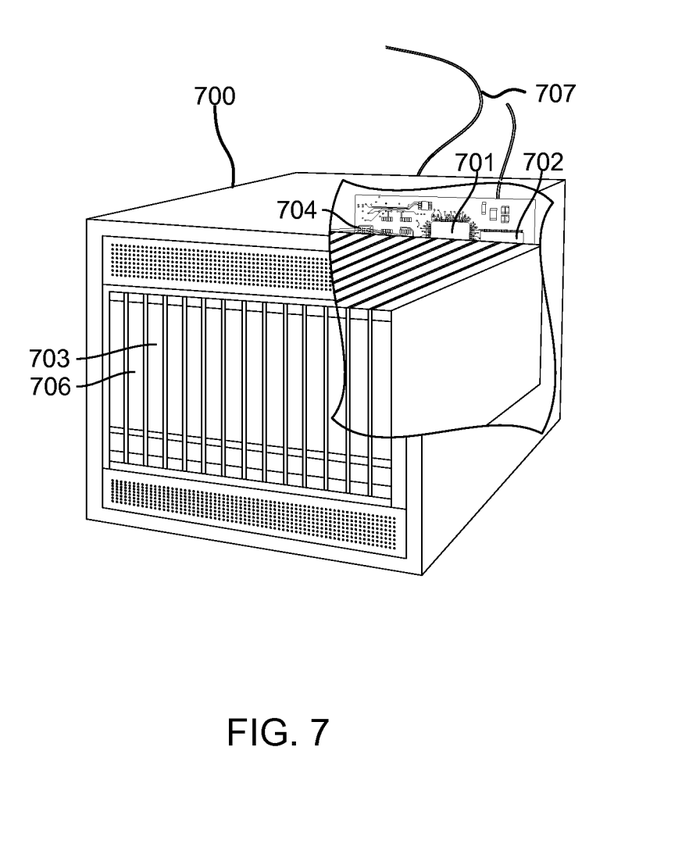
FIG. 7 is a component diagram of an example server suitable for use with the various embodiments.

The various embodiments may also be implemented on any of a variety of commercially available server devices, such as the server 700 illustrated in FIG. 7. Such a server 700 typically includes a processor 701 coupled to volatile memory 702 and a large capacity nonvolatile memory, such as a disk drive 704. The server 700 may also include a floppy disc drive, compact disc (CD) or DVD disc drive 706 coupled to the processor 701. The server 700 may also include one or more network transceivers 703, such as a network access port, coupled to the processor 701 for establishing network interface connections with a communication network 707, such as a local area network coupled to other announcement system computers and servers, the Internet, the public switched telephone network, and/or a cellular network (e.g., CDMA, TDMA, GSM, PCS, 3G, 4G, LTE, or any other type of cellular network).

The processors 602 and 701 may be any programmable microprocessor, microcomputer or multiple processor chip or chips that can be configured by software instructions (applications) to perform a variety of functions, including the functions of the various embodiments described above. In some devices, multiple processors may be provided, such as one processor dedicated to wireless communication functions and one processor dedicated to running other applications. Typically, software applications may be stored in the internal memory 604, 610, 702, or 704 before they are accessed and loaded into the processors 602 and 701. The processors 602 and 701 may include internal memory sufficient to store the application software instructions. In many devices the internal memory may be a volatile or nonvolatile memory, such as flash memory, or a mixture of both. For the purposes of this description, a general reference to memory refers to memory accessible by the processors 602 and 701 including internal memory or removable memory plugged into the device and memory within the processors 602 and 701 themselves.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module which may reside on a non-transitory computer-readable or processor-readable storage medium. Non-transitory server-readable, computer-readable or processor-readable storage media may be any storage media that may be accessed by a computer or a processor. By way of example but not limitation, such non-transitory server-readable, computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory server-readable, computer-readable and processor-readable media. Additionally, the operations of a method or algorithm may reside as one or any combination or set of codes and/or instructions on a non-transitory server-readable, processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for providing files from a Hypertext Transfer Protocol (HTTP) server, comprising:
   receiving a request from an application for an object in the HTTP server, wherein the object is a Dynamic Adaptive Streaming Over Hypertext Transfer Protocol (DASH) segment and the request is from a DASH client;
   determining whether the requested object is available in the HTTP server;
   holding the request in response to determining that the requested object is unavailable;
   determining whether a hold time threshold is satisfied without the object becoming available in the HTTP server;
   determining whether a next object is available in the HTTP server; and
   sending an error indication in response to the request when the next object is available in the HTTP server in response to determining that the hold time threshold is satisfied without the object becoming available at the HTTP server.

2. A Hypertext Transfer Protocol (HTTP) server comprising:
   means for receiving a request from an application for an object, wherein the object is a Dynamic Adaptive Streaming Over Hypertext Transfer Protocol (DASH) segment and the request is from a DASH client;
   means for determining whether the requested object is available;
   means for holding the request in response to determining that the requested object is unavailable;
   means for determining whether a hold time threshold is satisfied without the object becoming available;
   means for determining whether a next object is available; and
   means for sending an error indication in response to the request when the next object is available in response to determining that the hold time threshold is satisfied without the object becoming available.

3. A Hypertext Transfer Protocol (HTTP) server, comprising:
   a processor is configured with processor-executable instructions to perform operations comprising:
      receiving a request from an application for an object;
      determining whether the requested object is available;

holding the request in response to determining that the requested object is unavailable;
determining whether a hold time threshold is satisfied without the object becoming available;
determining whether a next object is available; and
sending an error indication in response to the request when the next object is available in response to determining that the hold time threshold is satisfied without the object becoming available,
wherein the processor is configured with processor-executable instructions to perform operations such that the object is a Dynamic Adaptive Streaming Over Hypertext Transfer Protocol (DASH) segment and the request is from a DASH client.

4. A non-transitory processor-readable storage medium having stored thereon processor-executable instructions configured to cause a Hypertext Transfer Protocol (HTTP) server to perform operations comprising:

receiving a request from an application for an object;
determining whether the requested object is available;
holding the request in response to determining that the requested object is unavailable;
determining whether a hold time threshold is satisfied without the object becoming available;
determining whether a next object is available; and
sending an error indication in response to the request when the next object is available in response to determining that the hold time threshold is satisfied without the object becoming available,
wherein the stored processor-executable instructions area configured to cause a HTTP server to perform operations such that the object is a Dynamic Adaptive Streaming Over Hypertext Transfer Protocol (DASH) segment and the request is from a DASH client.

* * * * *